United States Patent
Mezzatesta et al.

[11] Patent Number: 5,862,513
[45] Date of Patent: Jan. 19, 1999

[54] SYSTEMS AND METHODS FOR FORWARD MODELING OF WELL LOGGING TOOL RESPONSES

[75] Inventors: Alberto G. Mezzatesta; Michael A. Jervis; David R. Beard; Kurt M. Strack; Leonty A. Tabarovsky, all of Houston, Tex.

[73] Assignee: Western Atlas International, Inc., Houston, Tex.

[21] Appl. No.: 740,792

[22] Filed: Nov. 1, 1996

[51] Int. Cl.$^6$ ..................................................... G06F 19/00
[52] U.S. Cl. ................................................................. 702/9
[58] Field of Search .................................... 702/9, 11, 12, 702/13, 7, 8, 6; 706/929

[56] References Cited

U.S. PATENT DOCUMENTS

| | | | |
|---|---|---|---|
| 5,251,286 | 10/1993 | Wiener et al. | 702/12 |
| 5,300,700 | 4/1994 | Allen et al. | 702/8 |
| 5,345,077 | 9/1994 | Allen et al. | 702/8 |
| 5,444,619 | 8/1995 | Hoskins et al. | 702/13 |

OTHER PUBLICATIONS

Malki, H.A., et al., "On The Comparison Results of the Neural Networks Trained Using Well–Logs From One Service Company and Tested on Antoher Service Company's Data", Proceedings of 1993 IEEE International Conference on Neural Networks *ICNN '93, Apr. 1.

Smith, Mark, et al., "Lithofacies Determination From Wire–Line Log Data Using a Distributed Neural Network", Neural Networks for Signal Processing, Dec. 1991, pp. 483–482.

Malki, Heidar A., et al., "Well–Log Analysis Using Multi-layer Neural Networks to Classify Facies", Systems Engineering, Dec. 1992 IEEE International Conference, 1992, pp. 483–486.

*Primary Examiner*—Donald E. McElheny, Jr.
*Attorney, Agent, or Firm*—Richard A. Fagin

[57] ABSTRACT

A method for producing synthetic tool responses for a well logging tool for an earth formation, the method including, in one aspect, generating wellbore logging data for a particular part of an earth formation with a wellbore logging system with a wellbore logging tool, the earth formation having at least one layer, producing an input earth model of the particular part of the earth formation based on the wellbore logging data, inputting the input earth model to a trained artificial neural network, e.g. resident in a computer, the computer with the trained artificial neural network processing the input earth model and producing synthetic tool responses for the wellbore logging tool for one point or for a plurality of points in the earth formation.

20 Claims, 6 Drawing Sheets

Microfiche Appendix Included
(1 Microfiche, 72 Pages)

SYSTEMS AND METHODS FOR FORWARD MODELING OF WELL LOGGING TOOL RESPONSES

MICROFICHE APPENDIX

The specification of this invention includes a microfiche appendix. The microfiche appendix includes 1 microfiche having 72 total frames.

A portion of the disclosure of this patent document and appendices contain material which is subject to copyright protection. Facsimile reproduction by anyone of this patent document or the patent disclosure, as it appears in the U.S. Patent and Trademark Office patent file or records is permissible, but otherwise all copyright rights whatsoever are reserved.

BACKGROUND OF THE INVENTION

Field of the Invention

This invention is directed to well logging data interpretation systems and methods which use artificial neural networks and, in one particular aspect, to a system and method that is usable at a well site to predict well logging tool responses and thereby predict unknown formation parameters and reservoir descriptions.

Description of Related Art

Prior art well logging systems and methods provide a variety of data about formations through which the well extends; including, for example, resistivity data (induction and galvanic), acoustic data, vertical seismic profiling data, magnetic data, gravimetric data, temperature data, and nuclear data. Such data is related to various material properties of the formation, e.g. porosity permeability, electrical conductivity, magnetic susceptibility, density and rock acoustic velocity. In certain prior art systems and methods this data is interpreted and evaluated to improve prediction of oil and gas production from a given reservoir or field, to detect new oil and gas production zones, to provide a picture or model of formations and of reservoirs to facilitate the removal of hydrocarbons, and to enhance the process of well location.

Inversion provides an estimate of the material properties of a formation by updating and improving an initial earth model, containing a material property description of the subsurface, with a better model until an optimal model is obtained. An instrument response numerically calculated from a model is compared to the response actually measured by instruments; if they match, the model is a correct one. If they do not match, the model is changed, to improve the match between what is measured and what is calculated from the model. The update can be performed by known linear ("Inverse Problem Theory", Tarantola, 1987) or non-linear optimization methods ("Genetic Algorithms and Very Fast Simulated Reannealing", Ingber and Rosen, 1992). Numerical calculation of well logging tool responses is relatively slow, even on powerful computers when using wave propagation, nuclear or electromagnetic theory. Known inversion techniques are used to interpret different types of well logging data. These techniques simultaneously consider the borehole parameters, invasion parameters, and shoulder-bed effects with respect to a set of resistivity well logging measurements. However, certain conventional inversion techniques for such data require significant computational time and are not used at a well site.

An artificial neural network provides a powerful tool for interpolation between an input and an output dataset through a distributed set of weights. This interpolation is accomplished by a relatively small number of multiplications and additions which is several orders of magnitude faster than the numerical computation of the tool response using standard electromagnetic or acoustic propagation theory.

Previously, neural networks have been used mainly for pattern recognition and as interpolators for inversion of data to recover a model (Legget et al, 1993 and Poulton et al, 1992). Weiner et al, (1995) have used an artificial neural network to estimate the permeability of rocks in the subsurface given different types of well log data.

Certain known artificial neural networks (ANN) consist of a lattice arrangement of neurons, or nodes, connected by synapses or links much like the neurons in the human brain. Complex ANN structures have been built using sophisticated interconnections of simple building blocks or nodes. Layers of nodes are created and interconnections established between adjacent layers, called a feedforward network. Other architectures include connections between non-adjacent layers and to additional networks, called recurrent ANN's. Nodes can also be arranged into a map and connections between the nodes created and modified during training of the network as in Self Organizing Maps ("*Self-Organization and Associative Memory*," Kohonen, 1984).

In the human brain, information is processed by summation of all electrical impulses into a neuron which then causes the neuron to emit its own signal. Upon receiving the input electrical signals, the neuron modifies them, changing their amplitude and frequency, using an activation function. The input signals are then summed before the neuron outputs its' own signal. in a similar fashion, signals input into an ANN are changed by multiplying the input by an activation function and by a scalar value called a weight. The weights and the activation function can vary from node to node in the ANN. Typically, the input (x) and the output(f (x)) values from a node are give by $$f_k(x) = \Sigma w_{kj} R(x)$$

Where $f_k(x)$ is the output from node k and $W_{kj}$ are the weights connecting the j-th node to the k-th node and R is the activation function: typically a hyperbolic tangent (tanh (x)). After calculating the value of the activation function, the new input values for the node are summed and the output value is passed onto all the neurons directly connected with the stimulated node. The signal feeds through the network to the output nodes where the response is saved. Like the human brain, ANN's can be trained to recognize patterns or to provide an appropriate response to a given input. The weights of the network are modified during training until the output response to any given input is correct.

In prior art techniques for training an ANN, a training set of examples is created, using standard numerical simulation techniques. Typically, a training set contains thousands of members (e.g. theoretical data) generated from thousands of different models. Training consists of refining the set of weights of the nodes so that any given input model produces a correct response. At the start of training, node weights are randomly selected. A model corresponding to a member of the training set is input to the neural network and one or more outputs are generated by the network. This output is compared with raw data or a numerical estimate based on raw data. If the output curves do not match the data, the weights are then adjusted, either by back propagation (see, e.g. U.S. Pat. Nos. 5,134,685 and 5,107,442), or a non-linear optimization method such as simulated annealing (Ingber and Rosen, 1992) to improve the match between the two sets of curves. All the members of the training set are input to the network one at a time until all the members have been input. All the output curves and the data are compared and when the weights have stabilized i.e. when they do not change during continued training, or exposure to the training set, and the output matches the expected output for all the members of the training set, then the ANN is considered trained. A model that is not in the training set is then introduced into the ANN and the correct response is output. ANNs also have some ability to extrapolate responses when faced with a model containing values outside those with which it was trained. ANNs are described generally in U.S. Pat. No. 5,554,273 issued Sep. 10, 1996 which is incorporated fully herein by reference for all purposes.

There has long been a need, recognized by the present inventors, for a well logging data modeling system and method which provides accurate and acceptable results in significantly less time than known systems and which is useful at a well site with a variety of different types of well logging data and tools. There has long been a need, recognized and appreciated by the present inventors, for such systems and methods which employ trained ANNS. There has long been a need for an improved technique for training an ANN for use in such systems and methods.

SUMMARY OF THE PRESENT INVENTION

The present invention discloses systems and methods which use an ANN, preferably a trained ANN, for forward modeling to derive predictive data from an earth model (rather than the typical purpose of inversion procedures—to derive a model from measured raw data). Such a system according to the present invention using an ANN provides predictive tool responses for any input model for a particular well logging tool type. This reduces or eliminates the need for tedious numerical calculations related to tool measurements.

Systems according to the present invention using an ANN receive an input earth model or models (based on real data actually acquired by a real tool) and outputs an appropriate tool response (e.g., but not limited to, from a nuclear, electromagnetic, or acoustic well-logging tool). Responses can be generated for a number of different earth models. A separate ANN, in certain aspects, is created for each type of well-logging tool. Each such ANN may have its own training dataset of well-log tool responses (these training datasets contain measured actual real raw data for a real formation or synthetic responses derived based on such data).

The present invention uses an ANN to generate well-log tool responses, e.g. acoustic, nuclear, seismic, electrical, gravimetric or electromagnetic tool responses, given a model estimate of the subsurface surrounding a borehole or well. The ANN solves the forward problem of estimating data (tool measurements) from the model parameters such as, e.g. rock density, electrical conductivity or resistivity, acoustic wave velocity and porosity. With the tool response provided by the ANN, a more accurate model is obtained through local or global optimization techniques (e.g. see U.S. Pat. No. 5,377,307). According to the present invention the forward problem is iteratively solved using an ANN, preferably a trained ANN, and changes are made to the model which result in a better match between calculated tool responses and those obtained by direct measurement.

In certain aspects, the model of the subsurface for training the ANNs includes variations in material properties in one, two, and/or three spatial dimensions, i.e. where properties can vary with increasing distance from the borehole, along different azimuths or directions from the borehole, and where material properties vary with depth in the borehole.

The present invention, in certain embodiments, discloses a system for acquiring and using wellbore logging data for formation modeling and a method which employs an artificial neural network which is significantly faster than previously known methods and which can be used at a well site.

In one aspect, in a method for training an ANN according to the present invention, a wellbore logging tool acquires an initial set of data for a number of points or areas in a formation. A set of models or "training set" (e.g. of actual and/or synthetic tool responses) for the formation is produced based on the original set of wellbore logging data for a single or multi-layer formation. The data may include numerous data points for each layer. An earth model or "input model" from the training set is then introduced to an artificial neural network ("ANN") to produce an output of predictive synthetic tool responses for a particular well logging tool. The output synthetic responses are compared to theoretical responses and/or actual responses associated with the particular initial earth model to determine the amount of mismatch, if any, between the input model and the output synthetic data. If there is no mismatch or if the mismatch is acceptable (e.g. a 5% difference or less and preferably about 1.5% difference or less), the ANN is saved without further change or training. If the mismatch is unacceptable, the weights of the nodes of the network are optimized (e.g. by known back propagation techniques); another output is produced using the optimized network; and then again the output is compared to the associated tool responses (actual and/or synthetic) for the particular input model. This last step is repeated until an acceptable trained ANN is obtained.

In one aspect of systems and methods according to the present invention, for a particular tool a first ANN is trained with the earth model training set described above producing a trained ANN with a set of weights or coefficients associated with nodes of the trained ANN. A second ANN then uses as input for its training both the first input earth model training set and the first ANN output set of synthetic tool responses, producing a second ANN output set of synthetic tool responses. This output set is another set of tool responses associated with the tool responses for the particular input model. This procedure is repeated until the second ANN is acceptably trained.

Filed on even date herewith and co-owned with this invention is the U.S. Application entitled "Well Logging Data Interpretation Systems And Methods," naming Messrs. Frenkel and Mezzatesta as inventors. This application is incorporated herein fully for all purposes. Certain systems and methods described in said application may have various 1-D, 2-D, and 3-D forward modeling steps and inversion methods which employ a look-up table. Any or all of such steps may be enhanced by using a trained ANN according to the present invention.

The systems and methods according to the present invention may be used to output resistivity, acoustic, vertical seismic profiling, magnetic, gravity, temperature, and nuclear logging synthetic (i.e. predictive, extrapolant, and/or interpolant) data; and systems according to this invention may employ any known logging tool to acquire such data.

The present invention discloses, in certain aspects, a method for forward modeling to produce synthetic tool responses for a well logging tool for an earth formation having one layer or a plurality of two or more layers, the method including generating wellbore logging data for a particular part of an earth formation with a wellbore logging system including a wellbore logging tool disposed in the formation (this step optional), producing an input earth model based on the wellbore logging data, inputting the input earth model to a primary trained artificial neural network, and processing the input earth model with the primary trained artificial neural network to produce an output model that includes a set of synthetic tool responses for the wellbore logging tool for at least one point or for a plurality of points in the earth formation; such a method wherein the wellbore logging data is data from the group consisting of electrical resistivity data, acoustic data, seismic data, vertical seismic profiling data, magnetic data, gravimetric data, temperature data, and nuclear data; such a method wherein the primary trained artificial neural network is produced by a method including training a first artificial neural network with an input training set, the input training set comprising a plurality of earth models based on wellbore logging data and further comprising a set of wellbore logging tool responses associated with each earth model, producing a first trained artificial neural network, then producing a first output set of synthetic tool responses for the well logging tool with the first trained artificial neural network, and inputting to a second artificial neural network both the input earth model training set and the first output set of synthetic tool responses for the well logging tool, producing a second trained artificial neural network which then serves as the primary trained artificial neural network; any such method including comparing the wellbore logging data to the synthetic tool responses of the output model to determine an amount of mismatch between them, if the mismatch is acceptable, saving the output model for subsequent use, and, if the mismatch is not acceptable, further training the primary trained artificial neural network producing a secondary trained artificial neural network and producing a secondary output model that includes a set of secondary synthetic tool responses, and comparing the wellbore logging data to the set of secondary synthetic tool responses to determine amount of mismatch between them, if the mismatch is acceptable, saving the secondary output model, and if the mismatch is not acceptable again training the secondary artificial neural network producing a tertiary artificial neural network; such a method wherein acceptable mismatch is no more than 40%; such a method wherein acceptable mismatch is no more than 10%; such a method wherein the primary trained artificial neural network has a plurality of nodes and the further training of the primary trained artificial neural network comprises optimizing the nodes of the primary trained artificial neural network; such a method wherein the nodes are optimized by backpropagation; such a method for producing a second trained ANN including comparing the wellbore logging data to the synthetic tool responses of a secondary output model produced by the second trained artificial neural network to determine amount of mismatch between them, if the mismatch is acceptable, saving the secondary output model, and if the mismatch is not acceptable (e.g. more than 10%, 5% or 1.5%) further training the second trained artificial neural network producing a tertiary trained artificial neural network and producing therewith a tertiary output model that includes a set of tertiary synthetic tool responses, and comparing the wellbore logging data to the tertiary set of tool responses to determine amount of mismatch between them, if the mismatch is acceptable, saving the tertiary output model for subsequent use, and if the mismatch is not acceptable again training the tertiary artificial neural network producing a fourth artificial neural network; such a method wherein the secondary trained artificial neural network has a plurality of nodes and the further training of the secondary trained artificial neural network comprises optimizing the nodes of the secondary trained artificial neural network; any such method wherein the method is conducted at a well site having a wellbore extending into the formation, the wellbore logging tool disposed in the wellbore; such a method including conducting a subsequent wellbore operation at the well site based on the output model; such a method wherein the subsequent wellbore operation is from the group consisting of perforating casing lining the wellbore to produce hydrocarbons from the formation; drilling deeper in the formation; drilling at least one lateral bore from the wellbore; plugging and abandoning the wellbore; and removing the wellbore logging tool from the wellbore and then running at least one additional wellbore tool into the wellbore and using said at least one additional wellbore tool in the wellbore.

It is, therefore, an object of at least certain preferred embodiments of the present invention to provide:

New, useful, unique, efficient, nonobvious systems and methods: for acquisition of wellbore logging data and use thereof with a trained ANN to produce a formation model; for training an ANN; and, in certain aspects, for significantly faster analysis and interpretation of data;

Such systems and methods which result in a stable and accurate earth model for predicting formation parameters where actual raw logging data has not been obtained;

Such systems which may be used at a well site or at a location remote from the well site; and Such systems and methods which use various different wellbore logging tools which process various types of wellbore logging data, which utilize a trained ANN, and which provide a set of synthetic tool responses.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 3b presents a plan view of the schematic model of FIG. 3a.

FIG. 4c presents an output tool response based on the neural network developed according to the invention and superimposed on the input model of FIG. 4a.

DESCRIPTION OF EMBODIMENTS PREFERRED AT THE TIME OF FILING FOR THIS PATENT

Figure 1A:
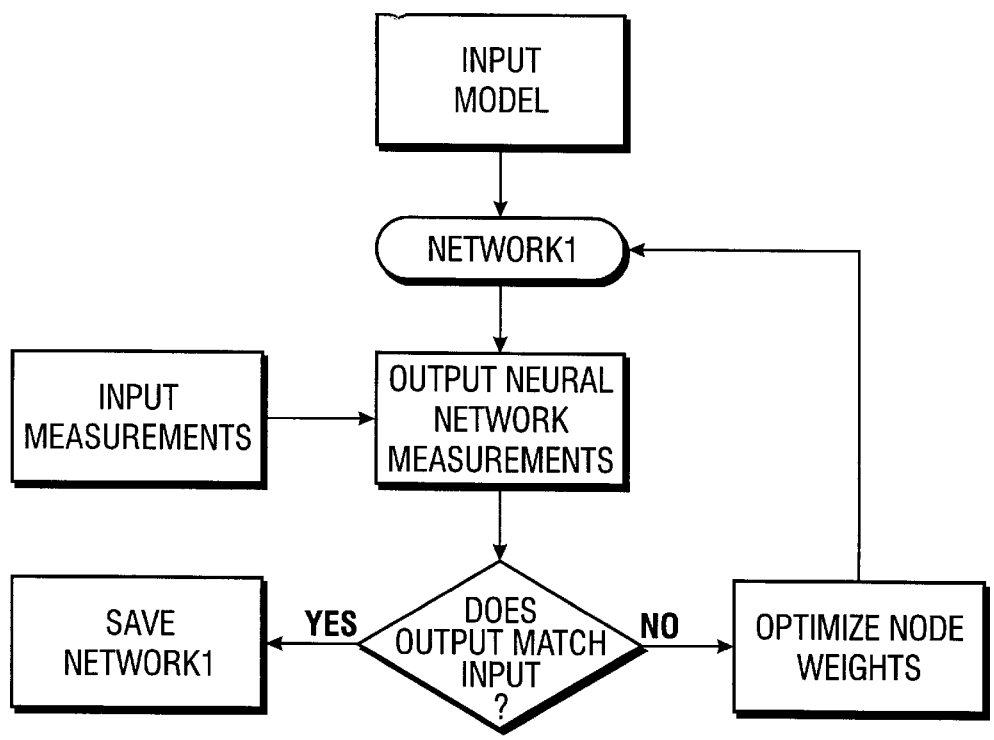
FIGS. 1a and 1b are schematic representations of a system and method according to the present invention.
Figure 1B:
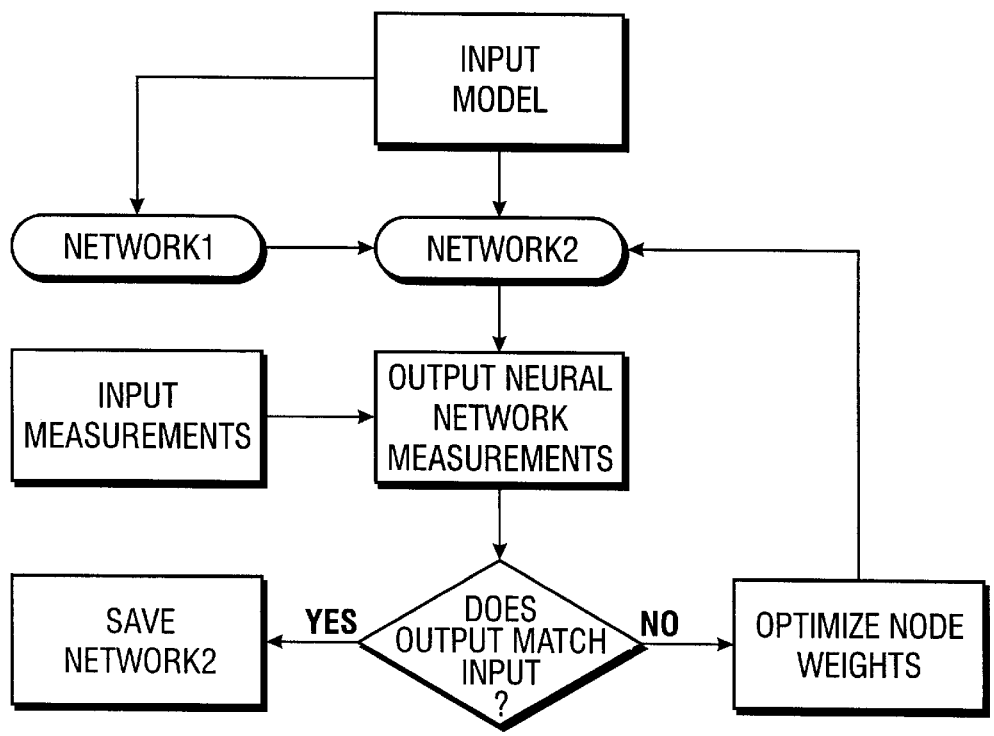

FIGS. 1a and 1b illustrate a system and method according to the present invention for training artificial neural networks for use in systems and methods according to this invention for forward modeling synthetic tool responses for a particular wellbore logging tool. A well logging tool acquires data from a formation for an initial data set which is used to produce an earth model (which may be a group of models) ("INPUT MODEL"). Alternatively, based on known raw data obtained by a particular tool in various actual formations, an input earth model is produced that includes synthetic rather than raw data. Any known method or any method described herein may be used to produce the initial earth model.

FIG. 1a shows an earth model (e.g. a set of one or more models from a training set) which is introduced (multiple models are introduced serially) to an artificial neural network ("NETWORK1"); i.e. the earth model ("INPUT MODEL"), a set of specific values for specific formation parameters, is input to an ANN which is defined by and embodied in a computer program resident in a computer. The ANN program processes the earth model and produces tool responses corresponding as close as possible to those of the initial earth model. Output values (synthetic tool responses) produced by the ANN ("OUTPUT NEURAL NETWORK MEASUREMENTS"), are compared to the actual data ("INPUT MEASUREMENTS") (actual raw data and/or synthetically developed data for an actual tool and actual formation) ("does output match input ?") and an amount of misfit is calculated. If the total misfit is acceptable ("yes") (e.g. a 40% degree of difference or less, preferably 20% or less, most preferably 10% or less), the ANN is acceptable and is saved for future use ("SAVE NETWORK 1"). If the amount of misfit is unacceptable ("no"), then the ANN is re-trained (nodes are modified and re-calculated and optimized as described below, e.g. by known back propagation techniques) ("OPTIMIZE NODE WEIGHTS") and the resulting recalculated network is used to produce another set of output values which is again tested (against actual data and/or synthetic data) for acceptable misfit as described above.

FIG. 1b illustrates a method according to the present invention for producing a trained artificial neural network ("SAVE NETWORK 2") which is similar to the method of FIG. 1a, but which includes as input for the network to be trained ("NETWORK 2") both the input earth model ("INPUT MODEL") and an output set of synthetic tool responses of a previously trained artificial neural network ("NETWORK 1") trained as described for FIG. 1a. The remaining procedure of the method of FIG. 1b is like that of FIG. 1a. In certain preferred embodiments the amount of mismatch (mismatch as discussed above) for the resulting trained ANN is preferably 5% or less, more preferably 2% or less, and most preferably 1.5% or less.

Figure 2:
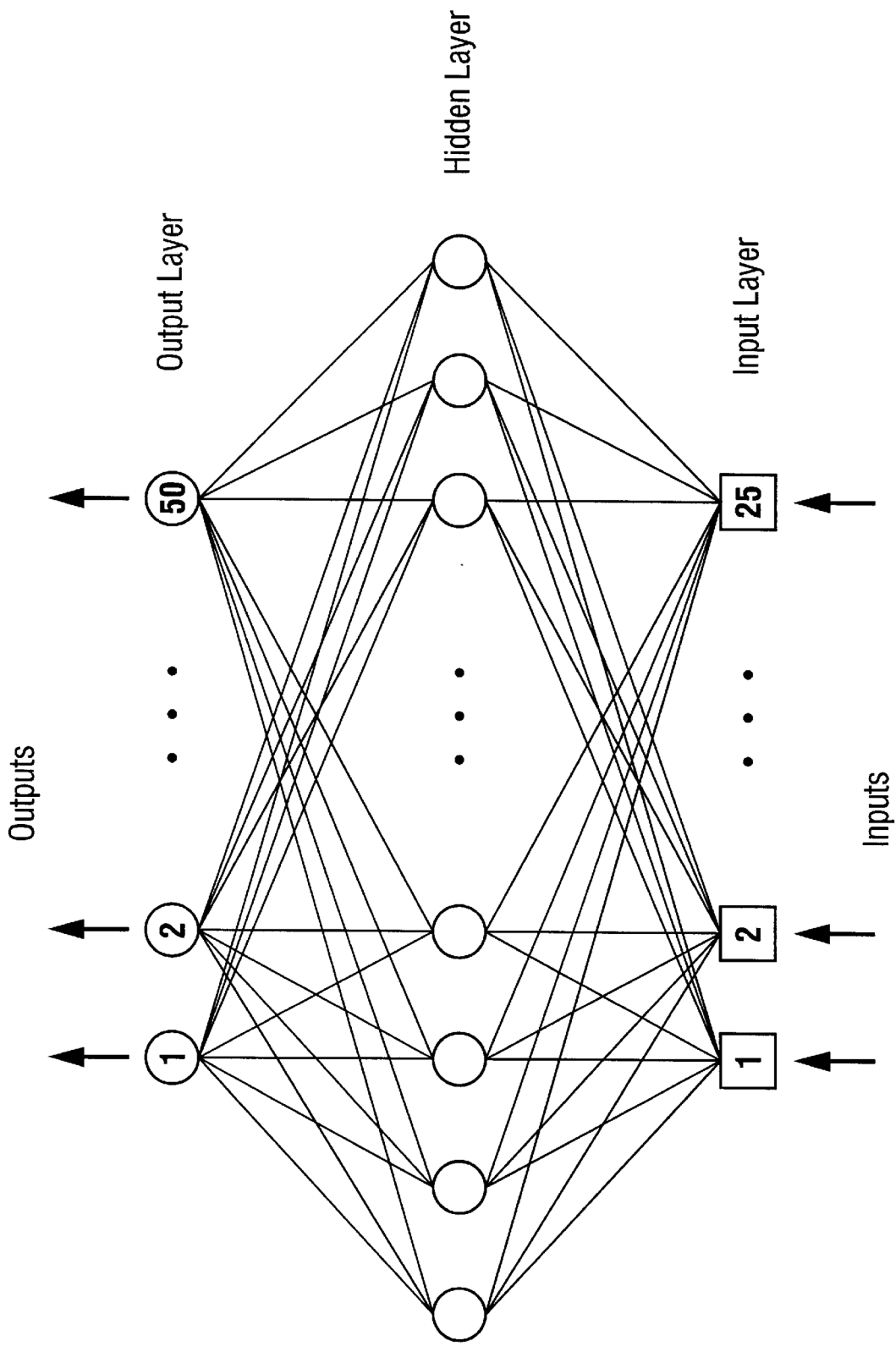
FIG. 2 is a schematic representation of a trained neural network according to the present invention.

FIG. 2 illustrates schematically a system according to the present invention with a trained ANN. The "Inputs" are the initial earth model, e.g. actual formation parameter values 1,2 up to 25 or more. Any desired number of values may be used and values for a variety of different formation parameters may be used simultaneously. An input model or models is acted on by the input layer of the ANN, producing outputs corresponding to the data of the input model. The ANN middle layer ("Hidden Layer") receives the outputs of the input layer nodes and processes them according to certain formulas (e.g. as described at page 3 hereof). The middle layer (as do all layers) represents a set of weights or "nodes" of the ANN (the circles which have blank interiors). Each middle layer node of the ANN is connected mathematically to each input node (1, 2, . . . 25) and to each output node (1, 2,. . . 50) and that connection is expressed by a coefficient. Each node at each layer represents a series of summations and multiplications (e.g. as described above at page 3 hereof). The middle layer outputs are inputs for the top output layer. The ANN is then asked to produce synthetic data for output points. The ANN produces the output values, ("Outputs") e.g. values 1, 2 up to 50 or more (synthetic tool responses) for the particular input model. Each line between any two circles in the first two levels of FIG. 2 represents a particular linear combination of weighted inputs. Similarly each output value is a linear combination of the weighted coefficients of all of the layers of FIG. 2. The system can thus provide synthetic responses which are not part of the input model.

Figure 3A:
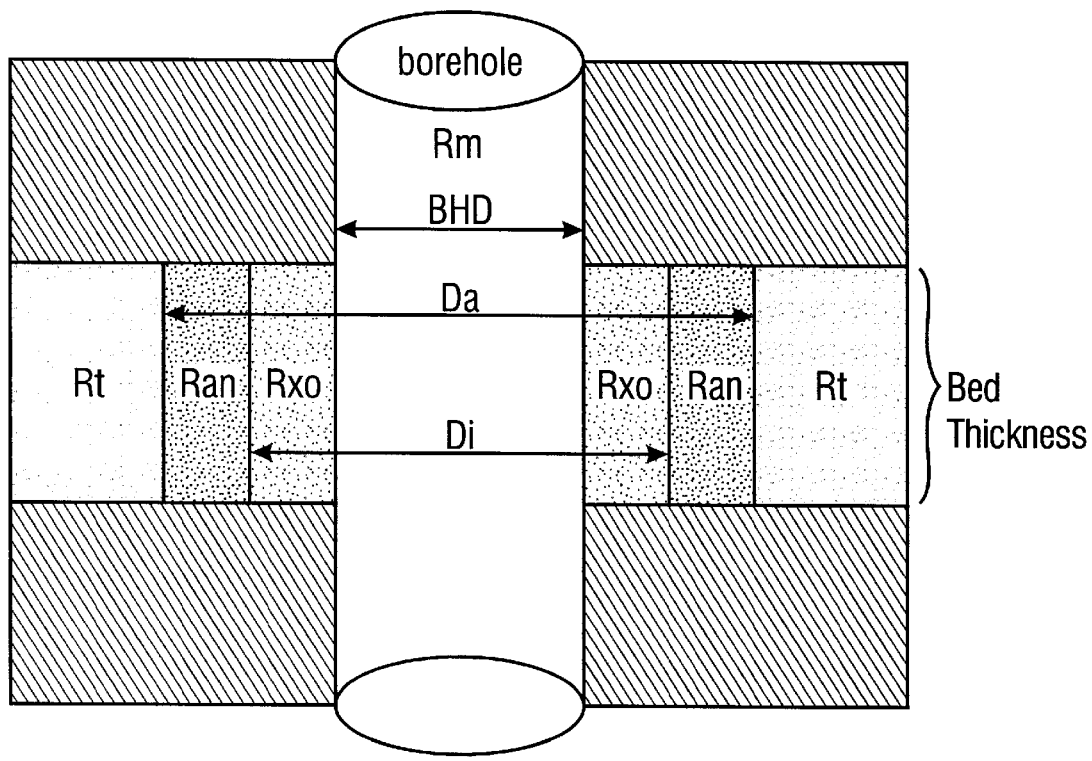
FIG. 3a presents a schematic model of a subsurface formation.
Figure 3B:
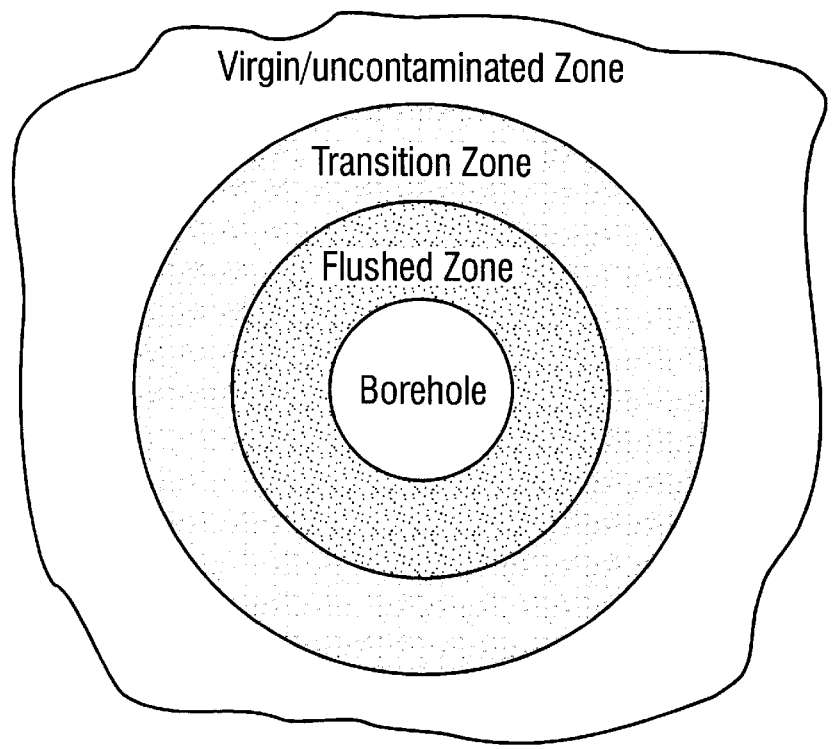

FIGS. 3a and 3b illustrate a particular 2-D earth model (input model) for use by systems and methods according to the present invention. An initial data set for the model of FIG. 3a includes resistivity data acquired by a resistivity well logging tool. A typical wellbore ("borehole") extends through a bed or layer of a formation in the earth. One or more such layers may be used for the input model The model includes a variety of parameters;

$R_m$=resistivity of drilling mud in the borehole
$R_{xo}$=resistivity of the flushed zone
$R_{an}$=resistivity of the transition zone
$R_t$=resistivity of the virgin zone Di is the mean diameter of the flushed zone. BHD is borehole diameter. Da is the mean diameter of the transition zone. The initial data set of the input model includes values for the various parameters illustrated in FIG. 3a including virgin zone parameters. The zone invaded by borehole fluid includes the flushed zone and the transition zone.

Figure 4A:
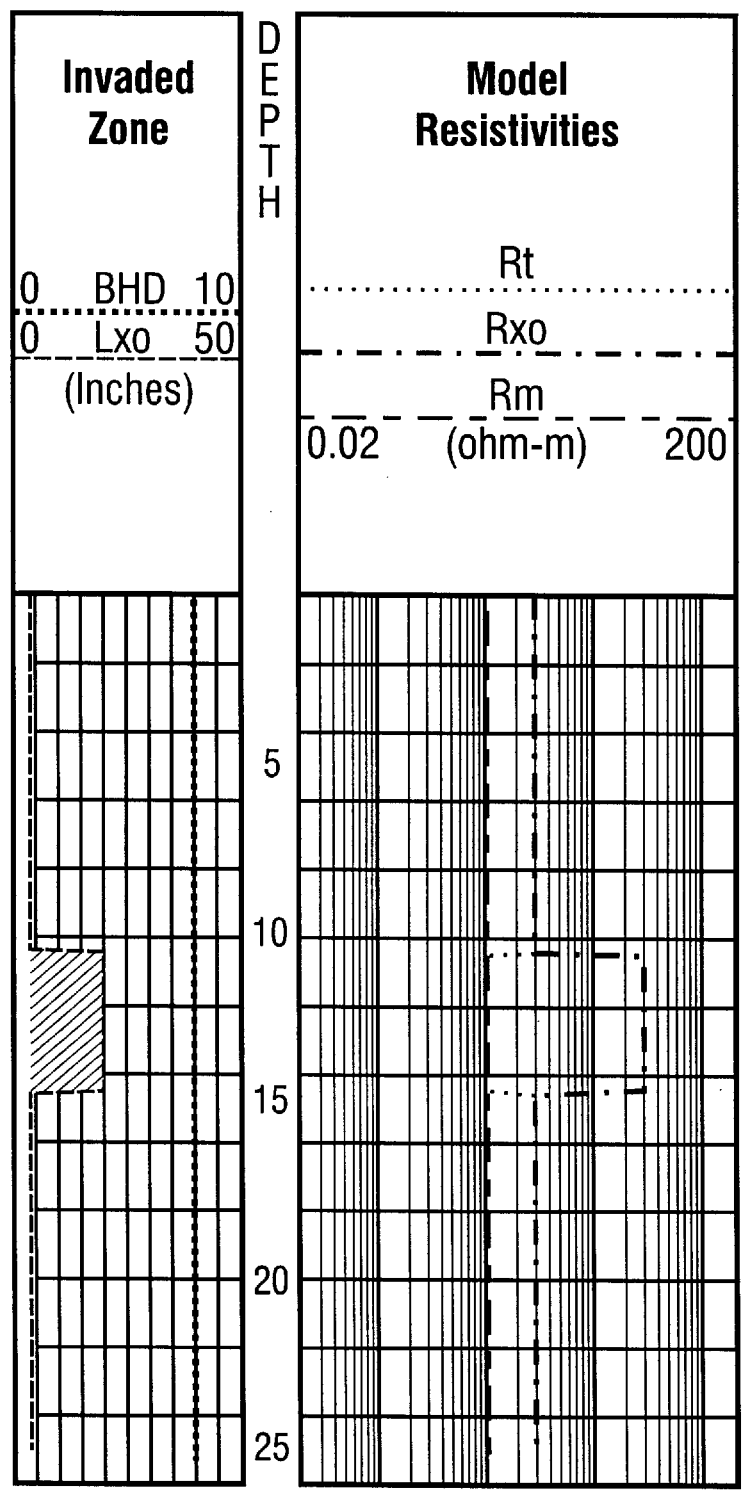
FIG. 4a presents a single input model developed according to the present invention.

FIG. 4a illustrates an initial earth model using resistivity data (in Ohm-meters) whose values serve as inputs for the ANN (see FIGS. 1a, 1b, and 2). FIG. 4A presents various actual resistivity values for a multi-layer formation. For this particular borehole, the borehole diameter is eight inches, the diameter of invasion ($L_{xo}$) varies from zero to twenty inches. The central depth scale (5, 10, 15. . .) is in feet. According to the initial earth model, virgin zone resistivity ($R_t$) is shown by a solid line; flushed zone resistivity ($R_{xo}$) is shown by a dashed line; and drilling mud resistivity ($R_m$) is shown by a broken line.

Figure 4B:
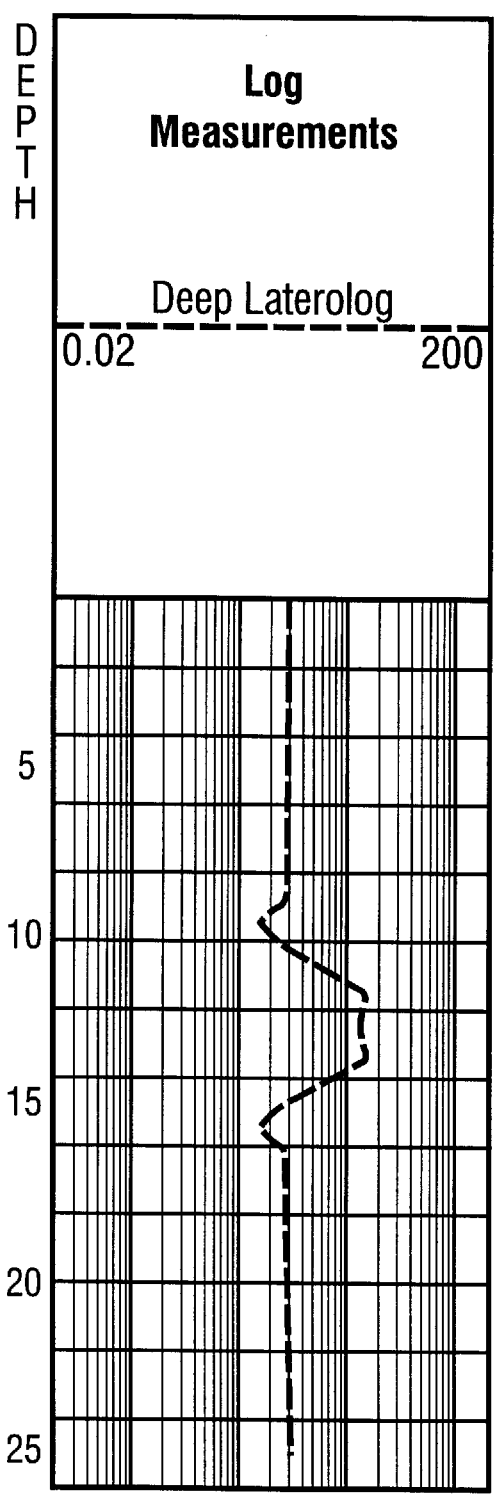
FIG. 4b presents a typical electrical log measurement prodfuced by the input model.

FIG. 4b presents tool responses (either raw data or synthetically generated; e.g. the INPUT MEASUREMENTS block in FIG. 1a) for the tool used to obtain the data of FIG. 4a.

Figure 4C:
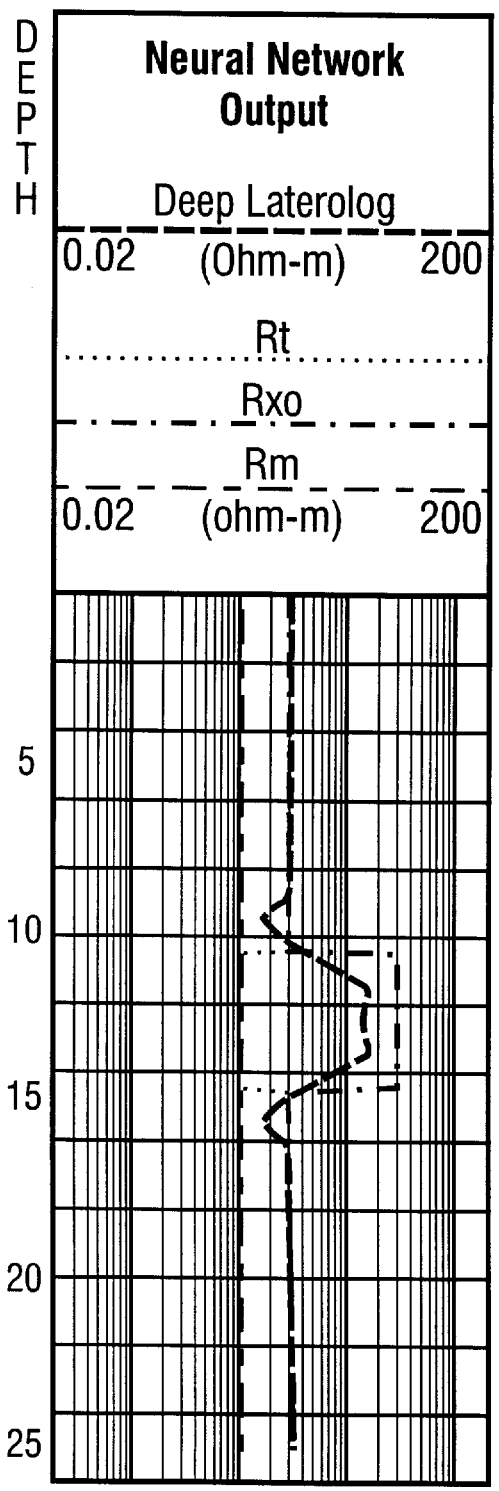

FIG. 4c illustrates an output of a trained ANN, i.e. a set of synthetic tool responses (e.g. the OUTPUT NEURAL NETWORK MEASUREMENTS block of FIG. 1a) generated by a system and method according to the present invention superimposed on the input earth model from FIG. 4a. In an ANN training situation, mismatch would be reviewed, e.g. in terms of an ANN output as shown in FIG. 4c and tool responses as shown in 4b.

Using a plurality of initial earth models as in FIG. 4a (e.g. for a variety of formation parameters, and a corresponding plurality of output tool responses as in FIG. 4b), a training set is produced for training a neural network.

Attached hereto and incorporated fully herein is a computer program entitled Train 1.C (pages 1–70) which defines and embodies an artificial neural network according to the present invention (e.g. as shown in FIGS. 1a and 1b). This program contains material which is subject to copyright protection. Facsimile reproduction by anyone of this patent document or the patent disclosure, as it appears in the U.S. Patent and Trademark Office patent file or records, is permissible but otherwise all copyright rights whatsoever are reserved. This ANN may be used in the methods described herein.

In one method according to the present invention a system according to the present invention is located at a well site and a well logging tool of the system in a borehole acquires a set of raw well logging data for a particular part of a formation adjacent the well logging tool. The system, in this aspect, includes a computer appropriately programmed to process the well logging data to produce an input earth model. A trained artificial neural network program resident in the computer then processes the input earth model to produce an output model of synthetic tool responses for part of the formation. This information (the output model) is then used as part of a decision making process at the well site regarding a number of different possible further steps, including but not limited to: whether to produce the well; at what location to perforate a cased well; whether to drill one or more horizontal or multi-lateral wellbores; whether to drill deeper; whether to plug and abandon the well; and whether to run new tools into the borehole, e.g. to acquire more data or to test the formation. The method according to the present invention may include any or a combination of any of these further steps.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized.

What is claimed is:

1. A method for forward modeling to produce synthetic tool responses for a well logging tool for an earth formation having at least one layer, the well logging tool disposed in a wellbore in the earth formation, the method comprising producing an input earth model of the earth formation based on the wellbore logging data, inputting the input earth model to a primary trained artificial neural network, processing the input earth model with the primary trained artificial neural network to produce an output model that includes a set of synthetic tool responses for the wellbore logging tool for at least one point in the earth formation.

2. The method of claim 1 wherein the wellbore logging data is data from the group consisting of electrical resistivity data, acoustic data, seismic data, vertical seismic profiling data, magnetic data, gravimetric data, temperature data, and nuclear data.

3. The method of claim 1 wherein the at least one point in the earth formation is a plurality of points.

4. The method of claim 1 wherein the at least one layer of the earth formation is a plurality of layers and the at least one point in the earth formation is a plurality of points.

5. The method of claim 1 wherein the primary trained artificial neural network is produced by a method comprising training a first artificial neural network with an input training set, the input training set comprising a plurality of earth models based on wellbore logging data and further comprising a set of wellbore logging tool responses associated with each earth model, producing a first trained artificial neural network, producing a first output set of synthetic tool responses for the well logging tool with the first trained artificial neural network, inputting to a second artificial neural network both the input earth model training set and the first output set of synthetic tool responses for the well logging tool, producing a second trained artificial neural network which then serves as the primary trained artificial neural network.

6. The method of claim 1 further comprising comparing the wellbore logging data to the synthetic tool responses of the output model to determine amount of mismatch between them, if the mismatch is acceptable, saving the output model for subsequent use, and if the mismatch is not acceptable, further training the primary trained artificial neural network producing a secondary trained artificial neural network and producing therewith a secondary output model that includes a set of secondary synthetic tool responses, and comparing the wellbore logging data to the set of secondary synthetic tool responses to determine amount of mismatch between them, if the mismatch is acceptable, saving the secondary output model, and if the mismatch is not acceptable again training the secondary artificial neural network producing a tertiary artificial neural network.

7. The method of claim 6 wherein acceptable mismatch is no more than 40%.

8. The method of claim 6 wherein acceptable mismatch is no more than 10%.

9. The method of claim 6 wherein the primary trained artificial neural network has a plurality of nodes and the further training of the primary trained artificial neural network comprises optimizing the nodes of the primary trained artificial neural network.

10. The method of claim 9 wherein the nodes are optimized by backpropagation.

11. The method of claim 5 further comprising comparing the wellbore logging data to the synthetic tool responses of a secondary output model produced by the second trained artificial neural network to determine amount of mismatch between them, if the mismatch is acceptable, saving the secondary output model, and if the mismatch is not acceptable, further training the second trained artificial neural network producing a tertiary trained artificial neural network and producing therewith a tertiary output model that includes a set of tertiary synthetic tool responses, and comparing the wellbore logging data to the tertiary set of tool responses to determine amount of mismatch between them, if the mismatch is acceptable, saving the tertiary output model for subsequent use, and if the mismatch is not acceptable again training the tertiary artificial neural network producing a fourth artificial neural network.

12. The method of claim 11 wherein acceptable mismatch is no more than 5%.

13. The method of claim 11 wherein acceptable mismatch is no more than 1.5%.

14. The method of claim 11 wherein the secondary trained artificial neural network has a plurality of nodes and the further training of the secondary trained artificial neural network comprises optimizing the nodes of the secondary trained artificial neural network.

15. The method of claim 14 wherein the nodes are optimized by back propagation.

16. The method of claim 1 wherein the method is conducted at a well site having a wellbore extending into the formation, the wellbore logging tool disposed in the wellbore.

17. The method of claim 16 further comprising conducting a subsequent wellbore operation at the well site based on the output model.

18. The method of claim 17 wherein the subsequent wellbore operation is from the group consisting of perforating casing lining the wellbore to produce hydrocarbons from the formation; drilling deeper in the formation; drilling at least one lateral bore from the wellbore; plugging and abandoning the wellbore; and removing the wellbore logging tool from the wellbore and then running at least one additional wellbore tool into the wellbore and using said at least one additional wellbore tool in the wellbore.

19. A method for forward modeling to produce synthetic tool responses for a well logging tool for an earth formation having a plurality of layers, the wellbore logging tool in a wellbore in the earth formation and generating wellbore logging data for a particular part of the earth formation from the group consisting of electrical resistivity data, acoustic data, vertical seismic profiling data, magnetic data, gravimetric data, temperature data, and nuclear data, the method comprising producing an input earth model of the particular part of the earth formation based on the wellbore logging data, inputting the input earth model to a primary trained artificial neural network, processing the input earth model with the primary trained artificial neural network to produce an output model that includes a set of synthetic tool responses for the wellbore logging tool for a plurality of points in the earth formation, the primary trained artificial neural network produced by training a first artificial neural network with an input training set producing a first trained artificial neural network, producing a first output set of synthetic tool responses for the well logging tool with the first trained artificial neural network, and inputting to a second artificial neural network both the input earth model training set and the first output set of synthetic tool responses for the well logging tool, producing a second trained artificial neural network which serves as the primary trained artificial neural network.

20. The method of claim 19 further comprising comparing the wellbore logging data to the synthetic tool responses of the output model to determine amount of mismatch between them, if the mismatch is no more than 5%, saving the primary trained artificial neural network for subsequent use, and if the mismatch is not acceptable, further training the primary trained artificial neural network producing a secondary trained artificial neural network and producing therewith a secondary output model that includes a set of secondary synthetic tool responses, and comparing the wellbore logging data to the secondary set of tool responses to determine amount of mismatch between them, and if the mismatch is acceptable, saving the secondary output model, and if the mismatch is not acceptable again training the secondary artificial neural network producing a tertiary artificial neural network.

* * * * *